United States Patent
Chen

(10) Patent No.: US 6,927,553 B2
(45) Date of Patent: Aug. 9, 2005

(54) PHASE-LOCKED BATTERY CHARGE SYSTEM

(76) Inventor: Liang-Jui Chen, No. 64, Wen-Hua Road, Hu-Wei Town, Yun-Lin Hsien (TW)

(*) Notice: Subject to any disclaimer, the term of this patent is extended or adjusted under 35 U.S.C. 154(b) by 145 days.

(21) Appl. No.: 10/660,516

(22) Filed: Sep. 12, 2003

(65) Prior Publication Data

US 2005/0057222 A1 Mar. 17, 2005

(51) Int. Cl.[7] .................. H01M 10/44; H01M 10/46
(52) U.S. Cl. .......................................... 320/124
(58) Field of Search ......................... 320/124, 125, 320/137, 160; 331/8, 17

(56) References Cited

U.S. PATENT DOCUMENTS 5,382,923 A * 1/1995 Shimada et al. ............ 331/8
2004/0169563 A1 * 9/2004 Abbasi et al.

* cited by examiner

*Primary Examiner*—Edward H. Tso
(74) *Attorney, Agent, or Firm*—Troxell Law Office, PLLC

(57) ABSTRACT

In a phase-locked battery charge system, the structure its circuit is similar to a phase-locked loop; by means of its specific auto-tracking and auto-locking capabilities, a complete battery charge process can be accomplished automatically in the order of bulk current charge, variable current charge, and float charge. Therefore, this invention features with its simple circuit structure, good charge current, and assured safe charge effect.

9 Claims, 8 Drawing Sheets

(a)

(b)

(c)

(a)

(b)

(c)

PHASE-LOCKED BATTERY CHARGE SYSTEM

BACKGROUND OF THE INVENTION

1. Field of the Invention

This invention relates to a phase-locked battery charge system, more particularly to a battery charging system emphasizing on simple circuit structure, good charge current, and safe charge conditions.

2. Description of the Related Art

In general, there are different kinds of secondary batteries including lead acid batteries, Nickel-Cadmium batteries, Nickel-Hydrogen batteries, and Lithium-Ion batteries, and thus many charging strategies for the foregoing batteries have been developed, such as a constant trickle current charge, bulk current charge, and constant-voltage/constant-current charge (or also known as constant-voltage restricted-current charge or two-stage charge).

Further, the most popular constant-voltage/constant-current battery charge strategy uses the bulk current to charge a battery from the beginning until a predetermined final voltage is reached. After the predetermined voltage is reached, the battery charger will charge the battery with a constant voltage equal to the value of a predetermined voltage, and the charging current will be decreased automatically. When the charging current is decreased to zero, the battery is regarded as 100% fully charged.

Further, a fuzzy quick charge system having the active state-of-charge detection capability is developed as disclosed in the R.O.C. Invention Patent No. 140649, which can obtain an appropriate value for the charge current to improve the battery charge performance, and neural networks and genetic algorithms are also adopted to harmonize and optimize the variables in the fuzzy control battery charge system in order to obtain a more appropriate charging current.

SUMMARY OF THE INVENTION

The objective of this invention is to provide a phase-locked battery charge system having a circuit similar to a phase-locked loop; by means of its specific auto-tracking and auto-locking capabilities, a complete battery charge process can be accomplished automatically in the sequence of bulk current charge, variable current charge, and float charge.

1. This invention Can Solve the Following Problems:
1. The trickle charge strategy has the advantages of simple circuit structure and low cost, but the battery charge takes too long, which usually exceeds 10 hours. Therefore, it is generally used for overnight charge only.
2. The bulk current charge strategy adopts a current larger than that of the trickle charge, but it has a disadvantage that the battery cannot be 100% fully charged so easily according to the voltage detected precision, and thus undercharge or overcharge often occurs.
3. The constant-voltage/constant-current charge strategy originally can prevent overcharge effectively, and thus lengthening the charging time. Furthermore, open control architecture is adopted for the traditional constant-voltage/constant-current charge strategy, which is theoretically not safe enough for the control.
4. The fuzzy quick charge system having the active state-of-charge detection capability definitely can reduce the charging time, and assure a safe condition for charging batteries. Although it has a very attractive charging performance, its shortcoming resides on that the circuit architecture is too complicated and requires high production costs.

The Way of Solving the Aforementioned Problems:

To solve the foregoing problems, this invention makes use of a phase comparator, a current pump, a battery, a differential amplifier, and a voltage control oscillator to constitute a phase-locked battery charge system. It is a fast, safe, and low-price battery charge system that provides better charging current with safer charging conditions, and has the features of auto-tracking, auto-locking, and high precision,

BRIEF DESCRIPTION OF THE DRAWINGS

Other features and advantages of the present invention will become apparent in the following detailed description of the preferred embodiments with reference to the accompanying drawings, in which:

FIG. 6($b$) is a diagram of pump output voltage $V_{pe}$ with a smaller phase error according to the present invention.

FIG. 6($c$) is a diagram of pump output voltage $V_{pe}$ with a larger phase error according to the present invention.

FIG. 8($b$) is a curve of the charging result of a phase-locked battery charge system with automatic bulk current, variable current, and float charge functions in the charging process according to the present invention.

FIG. 8($c$) is a curve of the charging result of a phase-locked battery charge system that shows a 100% full charge according to the present invention.

FIG. 9($b$) is the waveform of the input frequency and feedback frequency of the phase-locked battery charge system at 20 minutes.

FIG. 9($c$) is the waveform of the input frequency and feedback frequency of the phase-locked battery charge system at 150 minutes.

SYMBOLS

| | |
|---|---|
| PLBCS: | Phase-Locked Battery Charge System |
| PFC: | Phase/Frequency Comparator |
| LPF: | Low Pass Filter |
| VCO: | Voltage Control Oscillator Pump |
| PC: | Phase Comparator |
| CP: | Current |
| BT: | Battery |
| DA: | Differential Amplifier |
| F: | Filter |
| V/C: | Voltage/Current Converter |
| CA: | Current Amplifier |
| Ucc and Uda: | Operation Amplifier |
| Qcc: | Power Field Effect Transistor |
| Cf: | Capacitance |
| $R_f$, $R_{cc}$ $R_{da1}$, $R_{da2}$, $R_{da3}$, $R_{da4}$: | Resistance. |

DETAILED DESCRIPTION OF THE PREFERRED EMBODIMENTS

To make it easier for our examiner to understand the objective of the invention, its structure, innovative features, and performance, we use a preferred embodiment together with the attached drawings for the detailed description of the invention.

Figure 1:
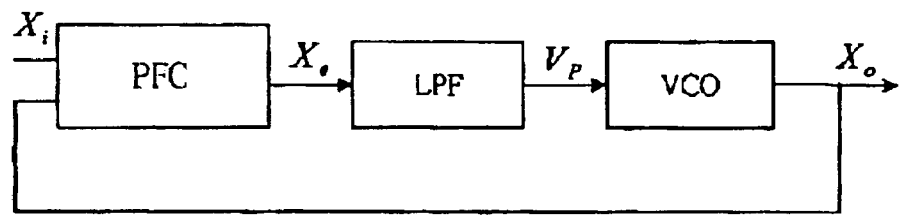
FIG. 1 is a block diagram of the basic structure of a phase/frequency locked circuit.

Please refer to FIG. 1 for the basic architecture of the phase/frequency-locked loop circuit, wherein $X_i$, $X_o$, $X_e$, and $X_p$ are respectively input phase/frequency $X_i$, output phase/frequency $X_o$, phase/frequency error $X_e$, and pump voltage $X_p$.

The Phase/Frequency Comparator (PFC) is used to compare the input phase/frequency $X_i$ and the output phase/frequency $X_o$ to obtain the phase/frequency error $X_e$. The low pass filter (LPF) acts as a phase/frequency driver for the voltage control oscillator VCO. The phase/frequency-locked loop circuit itself is a servo system, which can be used as a way of minimizing the phase/frequency error to zero, such that the phase/frequency of the voltage control oscillator (VCO) approaches the reference phase/frequency. Therefore, it is suitable for tracking frequency and phase of the output and input signals $X_o$, $X_i$.

Figure 2:
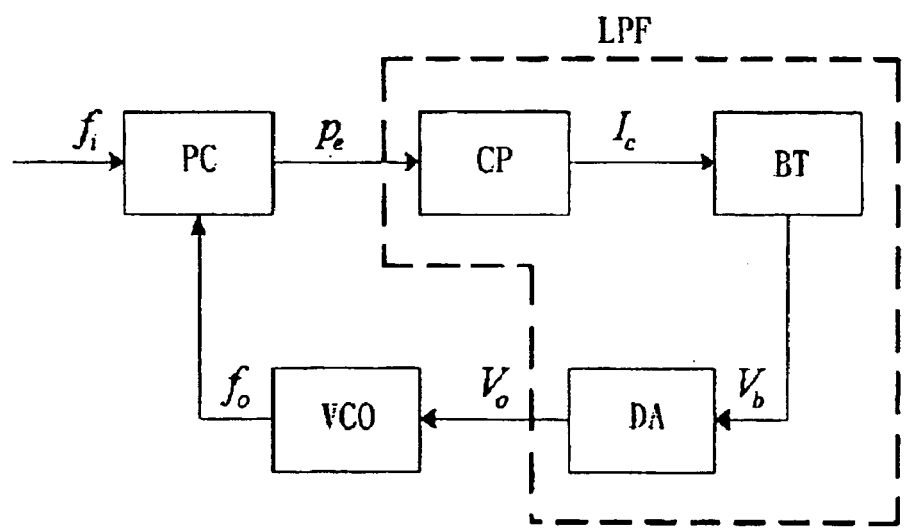
FIG. 2 is a block diagram of the phase-locked battery charge system of the present invention.

Refer to FIG. 2 for the Phase-Locked Battery Charge System (PLBCS), which is comprised of a phase comparator (PC), a current pump (CP), a battery (BT), a differential amplifier (DA), and a voltage control oscillator (VCO); wherein the current pump (CP), batter (BT) and differential amplifier (DA) constitute a low pass filter (LPF). In FIG. 2, it is obvious that the phase-locked battery charge system (PLBCS) has architecture similar to that of a phase-locked loop circuit, which implies the capabilities of auto-tracking, auto-locking, and high precision of the phase-locked battery charge system mentioned in this invention. The whole working flow is described as follows:

Firstly, the voltage Vb of the battery is detected and sent to a differential amplifier (DA), and after the differential amplifier (DA) amplifies the detected voltage Vb of the battery to fit the output voltage of the voltage control oscillator (VCO). Then, the voltage control oscillator (VCO) oscillates a feedback frequency $f_o$ corresponding to the detected voltage, and feeds the frequency back to the phase comparator (PC), and then the phase comparator (PC) will compare the input frequency $f_i$ and the feedback frequency $f_o$ and generate a phase error $p_e$. Finally, the phase error $p_e$ will be sent to the current pump (CP) to generate an appropriate charging current Ic to charge the battery (BT).

Figure 3:
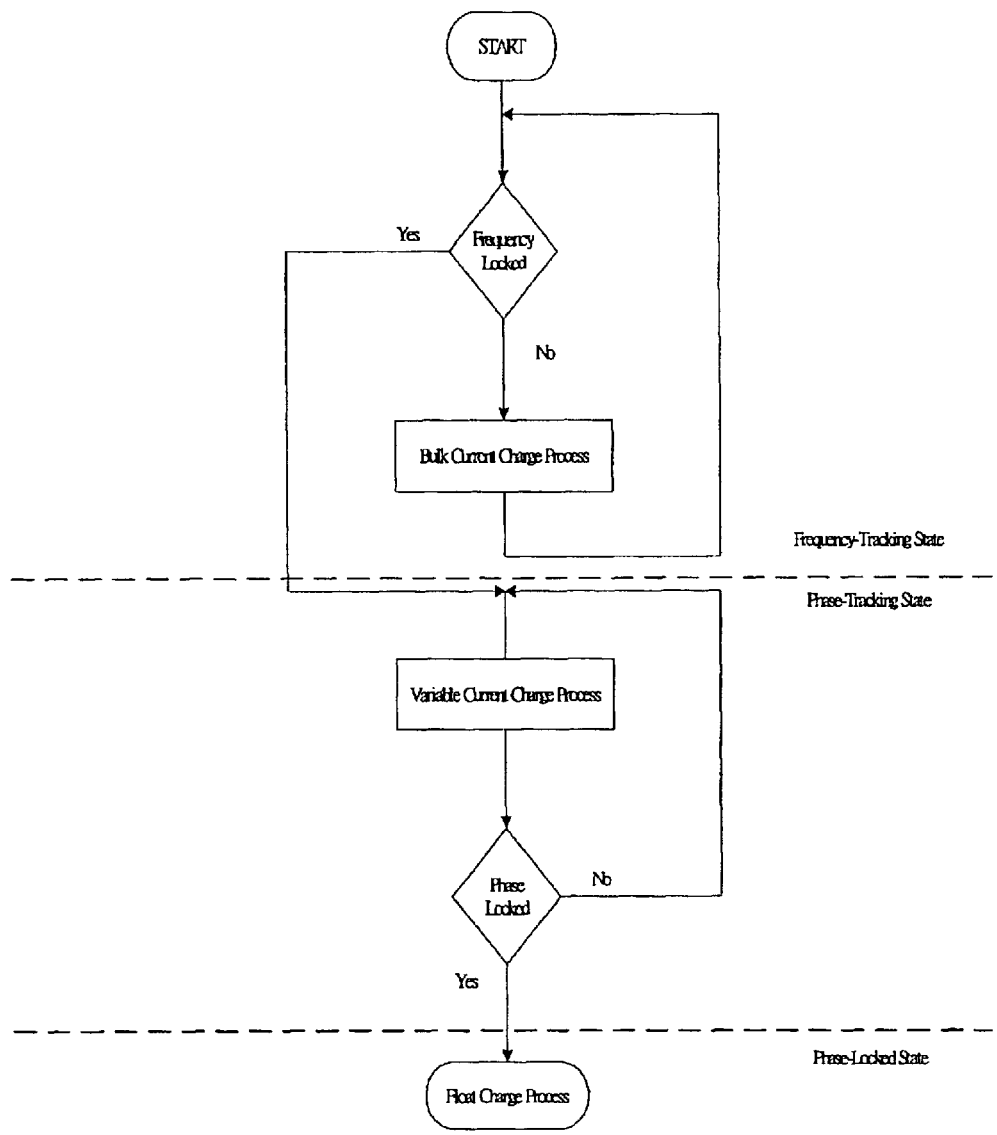
FIG. 3 is a flow chart of the equivalent battery charge of the phase-locked battery charge system of the present invention.

After going through the foregoing cycles for a number of times, the battery (BT) will be fully charged. It is noteworthy that the phase-locked battery charge system (PLBCS) mentioned in this invention includes three charging processes: bulk current charge, variable current charge, and float charge. Its equivalent charging process is shown in FIG. 3. Please refer to FIG. 2 together with FIG. 3. When the system is at the frequency-tracking state, the low pass filter (LPF) will provide a maximum voltage to drive the voltage control oscillator (VCO) to quickly reduce the error between the input frequency $f_i$ and the feedback frequency $f_o$. It means that the battery voltage is still not up to the predetermined voltage yet, and the system will continuously charge the battery (BT) with bulk current, and thus can effectively shorten the charging time. If the system is in the phase-tracking state, the low pass filter will appropriately reduce the driving voltage of the voltage control oscillator (VCO). In other words, the current pump (CP) will determine an appropriate charging current, and the system will be set in the charging process. Finally, when the feedback frequency/phase and the input frequency/phase are equal and the output of the current pump (CP) equals zero, the phase-locked battery charge system will enter into the phase-locked state to have a float charge on the battery (BT) and keep the battery at the predetermined voltage. In other words, the battery (BT) is 100% fully charged.

Figure 4:
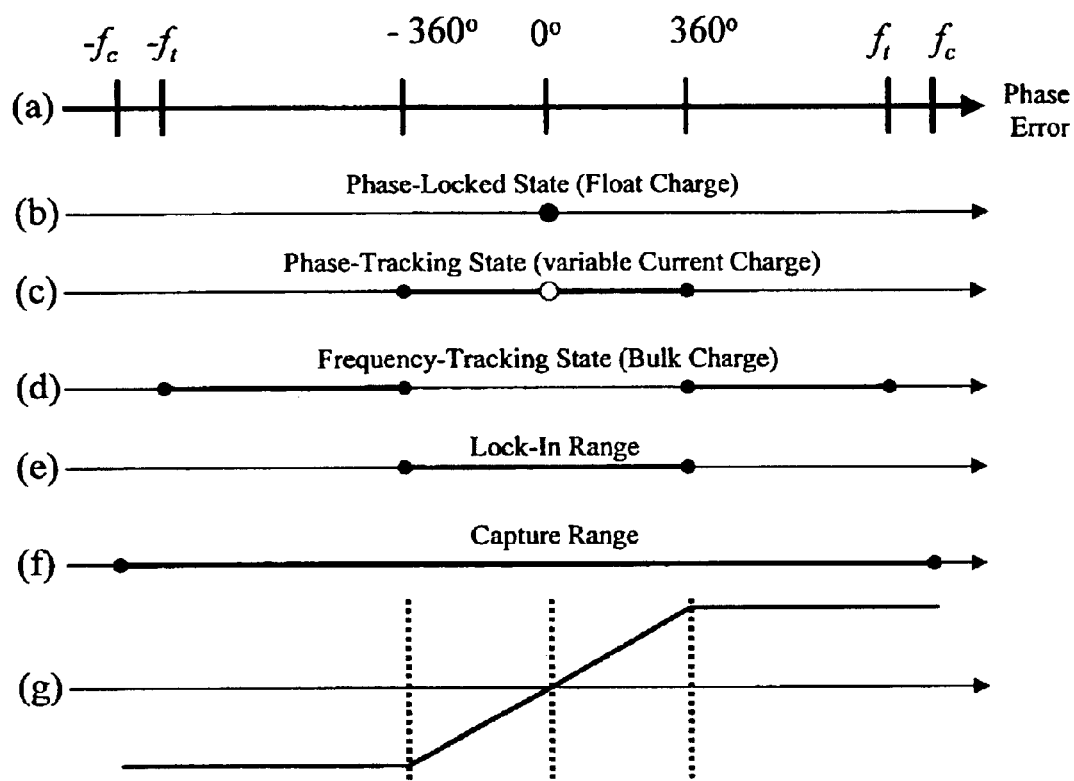
FIG. 4 is an illustrative diagram of the relation between phase-locked state, phase-tracking state, frequency-tracking state, capture range, and pump voltage of the present invention.

FIG. 4 is an illustrative diagram that shows the relation between the phase-locked state, phase-tracking state, frequency-tracking state, locked-in range, capture range, and pump voltage.

To implement the function as shown in FIG. 3 and Items (e) and (f) in FIG. 4, the phase-tracking range must be equal to the locked-in range, and the capture range must be larger than the frequency-tracking range. In FIG. 4, it is obvious that when the system is in the phase-locked state, the phase error $p_e \cong 0$, and the range in the phase-tracking state corresponds to $p_e \leq |360°|$, and the range in the frequency-tracking state corresponds to $|360°| < p_e \leq |f_d|$.

Figure 5:
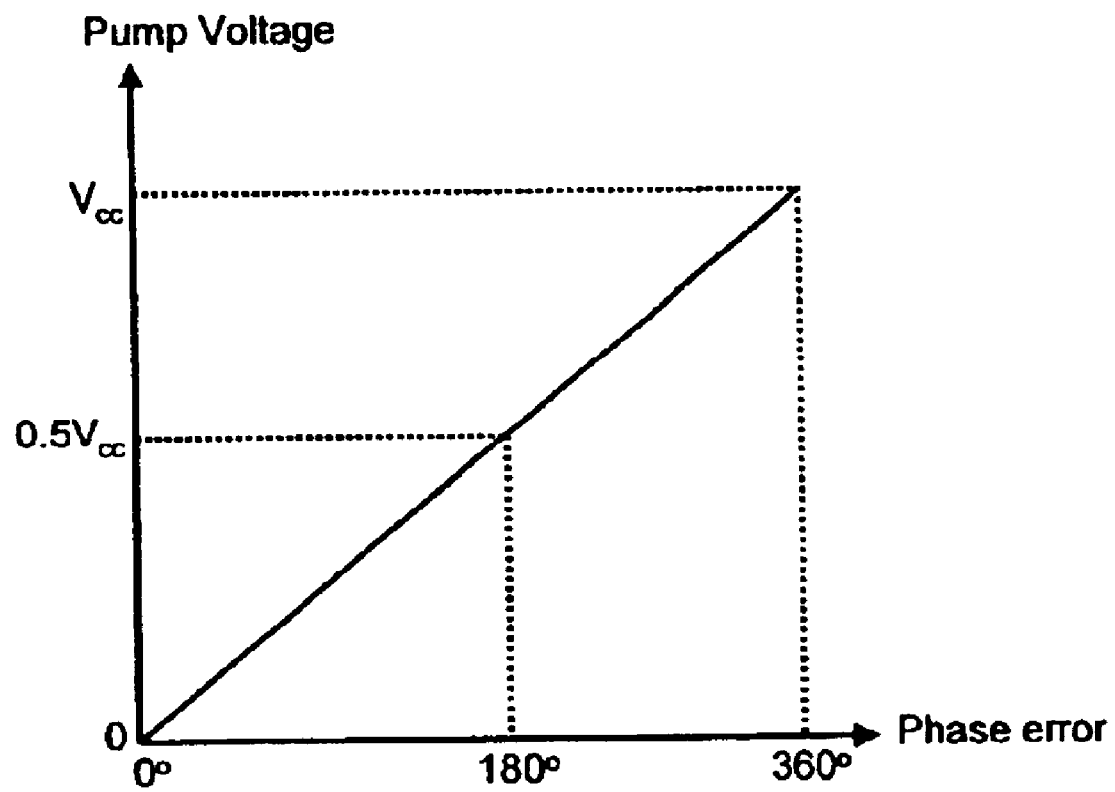
FIG. 5 is a curve of an average pump voltage of a successive positive edge-triggered phase comparator according to the present invention.

In the past, there were many different models of phase detectors proposed successively. Refer to FIG. 5 for a successive positive edge-triggered phase comparator which provides an average pump voltage-phase error curve, having a feature applicable to the phase-locked battery charge system. Therefore, the phase-locked battery charge system of this invention adopts the successive positive edge-triggered phase comparator.

Figure 6:
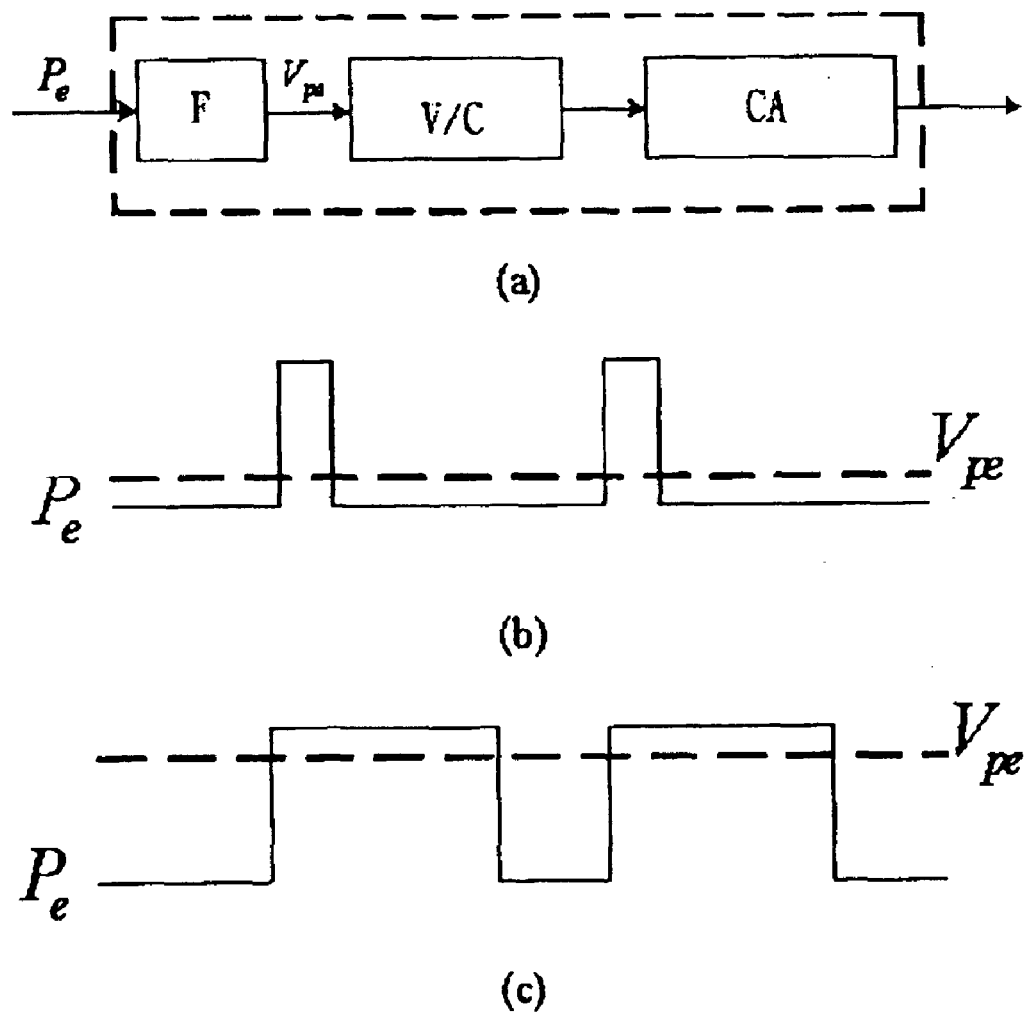
FIG. 6($a$) is a block diagram of the current pump used in the phase-locked battery charge system according to the present invention.

In the communication system and servo control system, there are many kinds of pump controller with phase-locked loops, however there are different ways of applying such pump controller in communication systems and servo control systems. In the battery charge system, the output current of the current pump (CP) is much larger than the traditional pump controller, because the pump controller adopted by the phase-locked battery charge system of the present invention needs to supply charging current to the battery. Item (a) in FIG. 6 shows the block diagram of the current pump of the phase-locked battery charge system, and such current pump is comprised of a filter (F), a voltage-to-current converter (V/C), and a current amplifier (CA); wherein the main function of the current amplifier is to enlarge the current of a small signal to a large power current for charging the battery (BT). The phase-locked battery charge system of the present invention adopts the process of the current pump (CP) as described below:

Firstly, when the phase error pulse $P_e$ is sent to the filter (F) to generate a phase error voltage $V_{pe}$, such phase error voltage $V_{pe}$ and phase error $P_e$ are in direct proportion as shown in Items (b) and (c) of FIG. 6, and then the voltage-to-current converter (V/C) will convert the phase error voltage $V_{pe}$ into a phase error current $I_{pe}$. Then, the phase error current $I_{pe}$ will be amplified to the battery charging current $I_c$ by the current amplifier (CA). Such battery charge current is sent to the battery (BT) at last to implement the process of charging the battery.

Figure 7:
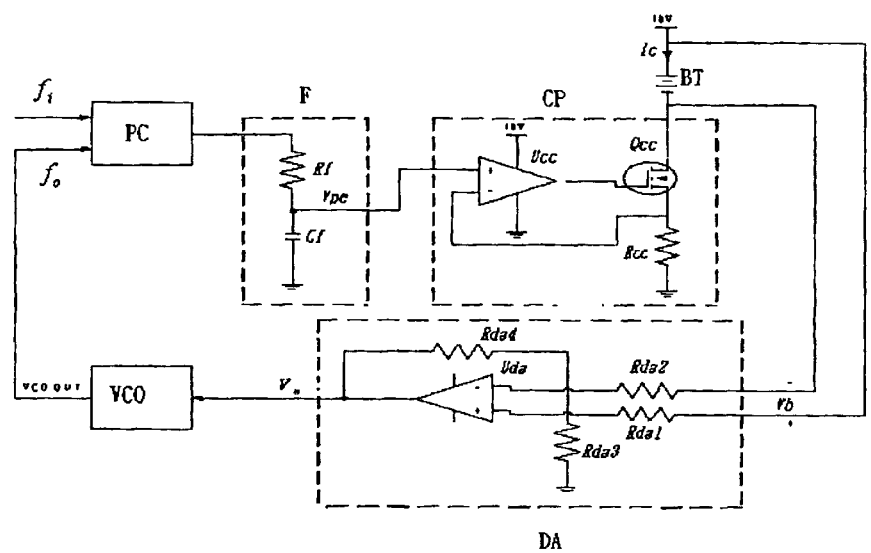
FIG. 7 is a circuit diagram of a phase-locked battery charge system of a preferred embodiment of the present invention.

Please refer to FIG. 7 for a preferred embodiment of the phase-locked battery charge system of the present invention, which adopts the 4.2V Lithium-Ion battery. This embodiment comprises a successive positive edge-triggered phase comparator (PC), a voltage control oscillator (VCO), a current pump (CP), a differential amplifier (DA) and a battery (BT). The current pump (CP) is constituted by a operation amplifier (Ucc), a power field effect transistor (Qcc), a capacitor ($C_f$), and two resistors ($R_f$, $R_{cc}$); wherein the actions of the resistor ($R_f$) and the capacitor ($C_f$) is similar to those of a wave filter (F), such that the pump voltage $V_{pe}$ can be found. The computational amplifier (Ucc), power field effect transistor (Qcc) and the resistor ($R_{cc}$) constitute the voltage-to-current converter (V/C) and the current amplifier (CA). The differential amplifier (DA) is comprised of a operation amplifier (Uda) and four pieces of resistors ($R_{da1}$, $R_{da2}$, $R_{da3}$, $R_{da4}$).

Figure 8:
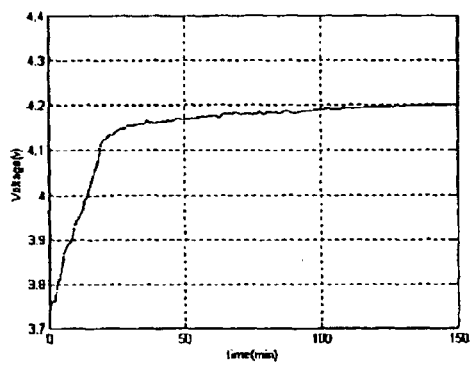
FIG. 8($a$) is a curve of the charging result of a phase-locked battery charge system without being overcharged during the charging process according to the present invention.
Figure 8:
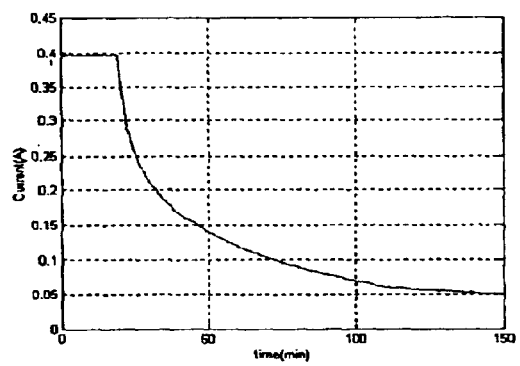
Figure 8:
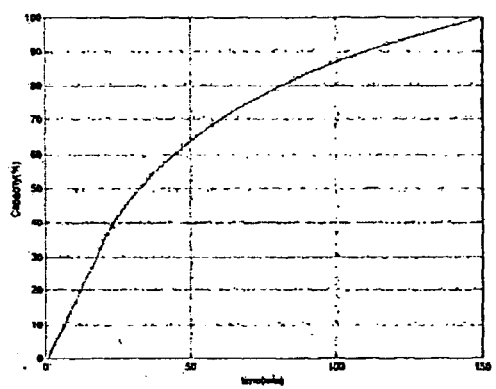
Figure 9:
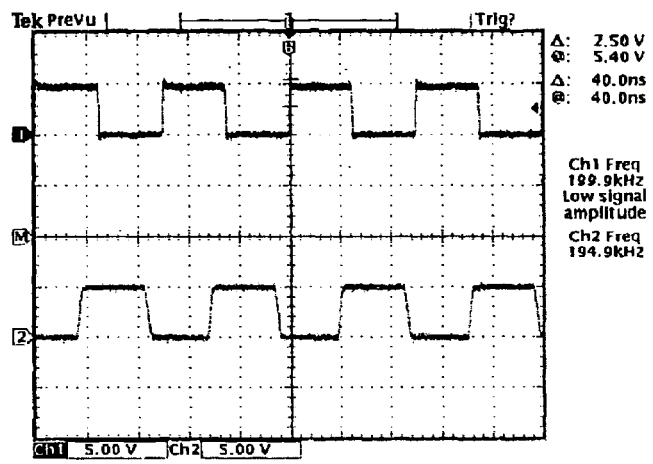
FIG. 9($a$) is the waveform of the input frequency and feedback frequency of the phase-locked battery charge system at 0 minute.
Figure 9:
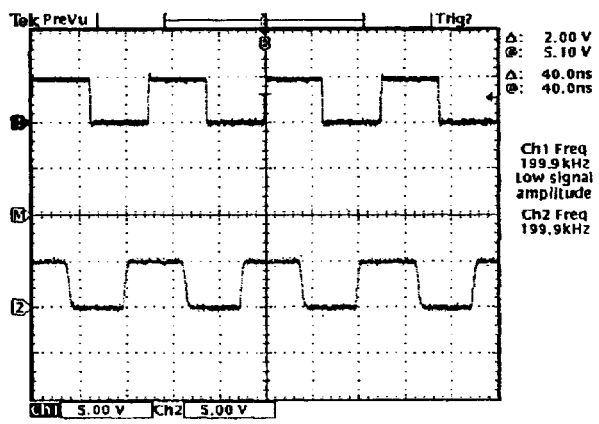
Figure 9:
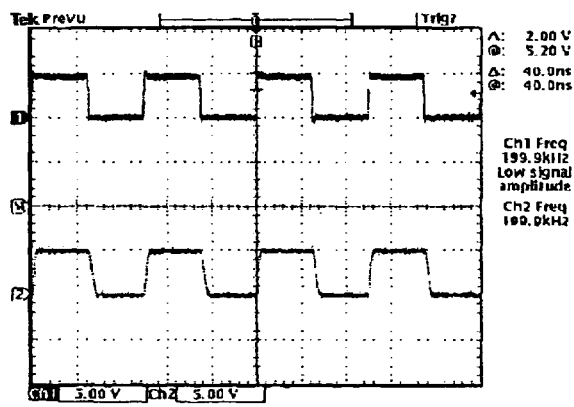

FIGS. 8(a), (b), and (c) show the experimental results of the open voltage of the battery (BT), the charging current (that is the output of the current pump (CP) and the charged capacity. The result shown in FIG. 8(a) does have any overcharge during the whole charging process. The result FIG. 8(b) can show that the phase-locked battery charge system surely has the functions of automatically completing the bulk current charge, variable current charge, and float charge in sequence. FIG. 8(c) shows that this invention surely can attain the 100% full charge. FIGS. 9(a), (b), and (c) show the waveforms of the input frequency and the feedback frequency at 0 minute, 20 minutes, and 150 minutes of the phase-locked battery charge system respectively, which stand for the frequency-tracking state, phase-tracking state, and phase-locked state. Therefore, the present invention is definitely a phase-locked loop circuit. From FIGS. 8 and 9, we can observe that the phase-locked battery charge system was in the bulk current charge process before the frequency is locked, and was in the variable current charge process before the phase is locked. Therefore the process of the action is like what is shown in FIG. 3. Furthermore, the results of the experiment show that the phase-locked battery charge system (PLBCS) definitely provides a better charging current, and obtains the expected safe charging conditions.

In view of the description above, the phase-locked battery charge system (PLBCS) of this invention is used to improve the battery charge speed and safe charging conditions. Its circuit architecture is the same as a phase-locked loop circuit, implying that the phase-locked battery charge system may use the special features of the phase-locked loop circuit such as the auto-tracking, auto-locking, and high precision. Therefore, the disclosed phase-locked battery charge system can easily implement a complete 3-sectional battery charging process automatically. In addition, the results of the experiments show that this invention can surely 100% fully charge a battery under safe charging conditions.

While the present invention has been described in connection with what is considered the most practical and preferred embodiment, it is understood that the invention is not limited to the disclosed embodiments but is intended to cover various arrangements included within the spirit and scope of the broadest interpretation and equivalent arrangements.

What is claimed is:

1. A phase-locked battery charge system having a phase comparator, a current pump, a battery, and a differential amplifier, and a voltage control oscillator; wherein its battery charge method comprising the steps of:
   (a) detecting a battery voltage for said differential amplifier, and releasing the detected battery voltage after amplifying the detected battery voltage, and determining an appropriate voltage for the input of said voltage control oscillator;
   (b) oscillating a feedback frequency corresponding to the detected voltage by said voltage control oscillator, and feeding the frequency back to said phase comparator;
   (c) comparing the input frequency and the feedback frequency by said phase comparator and generating a phase error;
   (d) sending said phase error to said current pump to generate an appropriate charge current to charge the battery; thereby after going through a plurality of aforementioned cycles, the battery being charged fully to provide a steady battery charge, and automatically and successively work in said frequency tracking state, phase tracking state, and phase-locked state.

2. The phase-locked battery charge system of claim 1, wherein said current pump involves in a process comprising the steps of:
   (a) sending a phase error pulse to a filter to generate a direct current voltage;
   (b) said direct current voltage being directly proportional to said phase error and said phase error voltage.
   (c) converting said phase error voltage into phase error current by said voltage/current converter;
   (d) amplifying said phase error current to battery charge current by said current amplifier; thereby said battery charge current being sent to said battery to implement the battery charge process.

3. A phase-locked battery charge system, comprising:
   a phase comparator; connected to an input terminal of a low pass filter and an output terminal of a voltage control oscillator, for comparing the input phase/frequency and output phase/frequency to obtain the phase/frequency error;
   a low pass filter, comprising a current pump, a differential amplifier, and a battery and acting as a way for the phase/frequency driver of said voltage control oscillator to minimize the phase/frequency error to zero, such that the frequency of the voltage control oscillator approaching a reference frequency; and
   a voltage control oscillator, connected to the output terminal of the differential amplifier of said low pass filter, such that the detected battery voltage being sent to differential amplifier for amplification and determining an appropriate voltage for the input of the voltage control oscillator; thereby the feedback frequency of the corresponding detected voltage being oscillated by said voltage control oscillator, and fed back to the phase comparator, and then said phase comparator comparing said input frequency and feedback frequency and generating a phase error, and finally sending said phase error to said current pump to generate an appropriate charging current to charge the battery, and the battery being charged fully after a number of aforementioned cycles in order to shorten the charging time and attain a quick full charge state.

4. The phase-locked battery charge system of claim 3, wherein said current pump comprises a operation amplifier, a power field effect transistor, a capacitor, and two resistors.

5. The phase-locked battery charge system of claim 4, wherein said resistor and capacitor constitutes a filter to provide the voltage for the current pump.

6. The phase-locked battery charge system of claim 3, wherein said low pass filter provides a upper-bound voltage to drive said voltage control oscillator in order to quickly reduce the error between the input frequency and feedback frequency to provide a bulk current charge in order to shorten the charge time and attain the frequency tracking effect.

7. The phase-locked battery charge system of claim 3, wherein said low pass filter can output a current determined by said current pump and control the driving voltage of the voltage control oscillator to provide variable current charge and attain the phase-locked float charge effect.

8. The phase-locked battery charge system of claim 3, wherein said phase comparator is a positive edge-triggered comparator.

9. The phase-locked battery charge system of claim 6, wherein said phase tracking range is equal to the locked-in range, and the capture range is larger than the frequency tracking range.

* * * * *